Oct. 15, 1963 E. G. BRITTAIN ETAL 3,107,320

TWO STAGE TIMING CIRCUIT

Filed Aug. 14, 1961 2 Sheets-Sheet 1

INVENTORS
WILLIAM A. STEIN
EDWARD G. BRITTAIN

BY D. Gordon Angus

ATTORNEY

Oct. 15, 1963 E. G. BRITTAIN ETAL 3,107,320

TWO STAGE TIMING CIRCUIT

Filed Aug. 14, 1961 2 Sheets-Sheet 2

INVENTORS
WILLIAM A. STEIN
EDWARD G. BRITTAIN
BY D. Gordon Angus
ATTORNEY

United States Patent Office 3,107,320
Patented Oct. 15, 1963

3,107,320
TWO STAGE TIMING CIRCUIT

Edward G. Brittain, Covina, and William A. Stein, Arcadia, Calif., assignors to Aerojet-General Corporation, Azusa, Calif., a corporation of Ohio
Filed Aug. 14, 1961, Ser. No. 131,273
8 Claims. (Cl. 317—148.5)

This invention relates to measuring devices and more particularly to a long period timing circuit.

The accuracy of long period timing circuits heretofore available were affected by changes in temperature, changes in supply voltage, and the presence of ripple voltage contained in the D.-C. power supply. In addition, the prior long period timing devices were not particularly satisfactory for use in rocket satellite programs, which imposed new and rigorous requirements for accuracy, reliability, weight, and resistance to vibration. What is needed, therefore, and comprises a principal object of this invention is to provide a simple reliable vibrator-resistant long period timing device, which remains highly accurate despite wide temperature extremes or fluctuation in the supply voltage.

The invention in its broadest aspect comprises the use of a two-stage timing circuit wherein each stage employs a unijunction transistor as a switching element. A capacitor is connected to the emitter terminal and a regulated supply voltage is connected to the base terminal of the unijunction transistor in each stage. The various stages of a long-period timing circuit are connected together in such a way that when the capacitor associated with the emitter terminal of the first stage of the circuit is charged to a predetermined level, the unijunction transistor in the first stage becomes momentarily conductive and transmits a pulse to the capacitor associated with the unijunction transistor in the second stage. With this arrangement, the circuit components are selected so that a predetermined number of pulses transmitted from the unijunction transistor in the first stage are required to raise the potential of the emitter terminal of the unijunction transistor in the second stage to its point of discharge. The discharge of the unijunction transistor in the second stage can be used to actuate a relay or alternatively it can be used to feed into additional stages, in order to obtain a still longer timing period.

Figure 1:
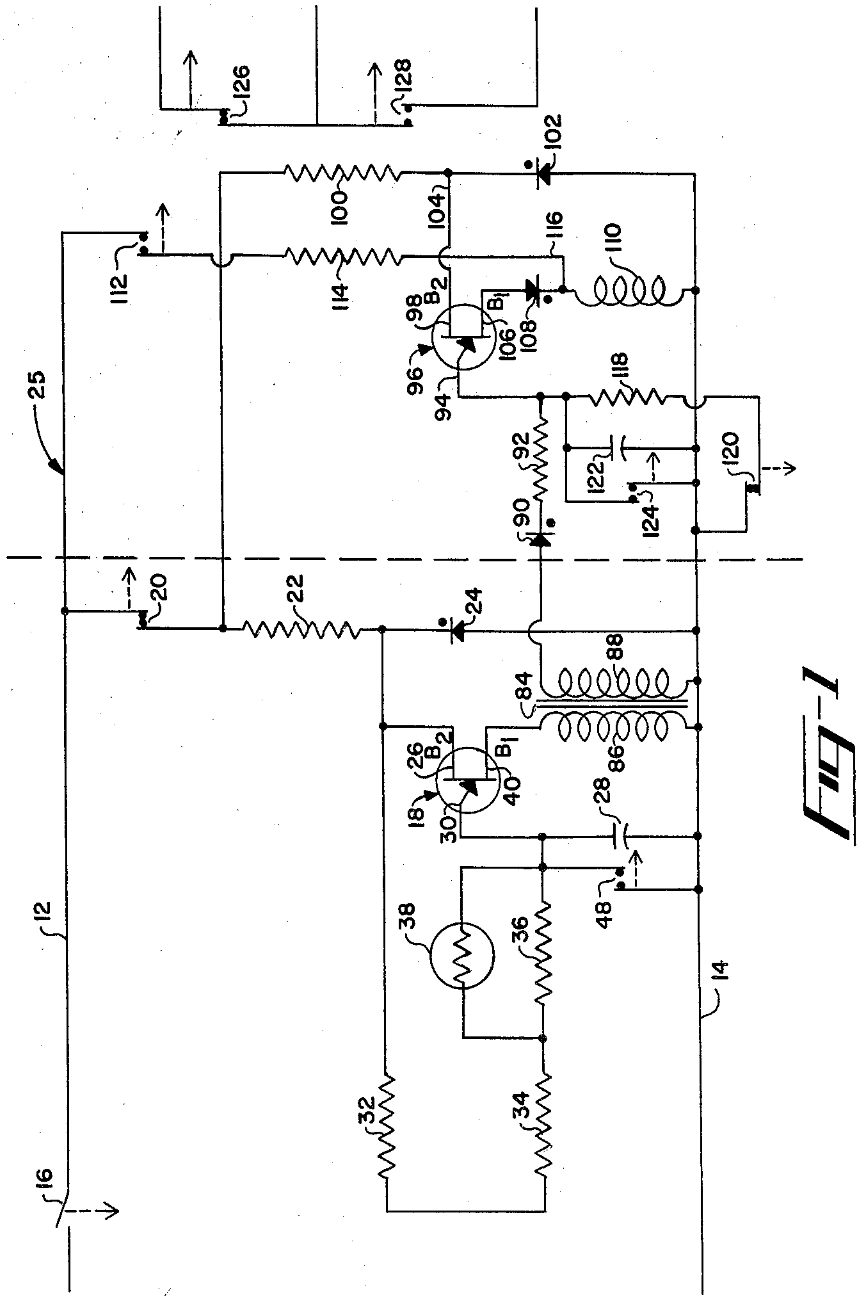
Figure 2:
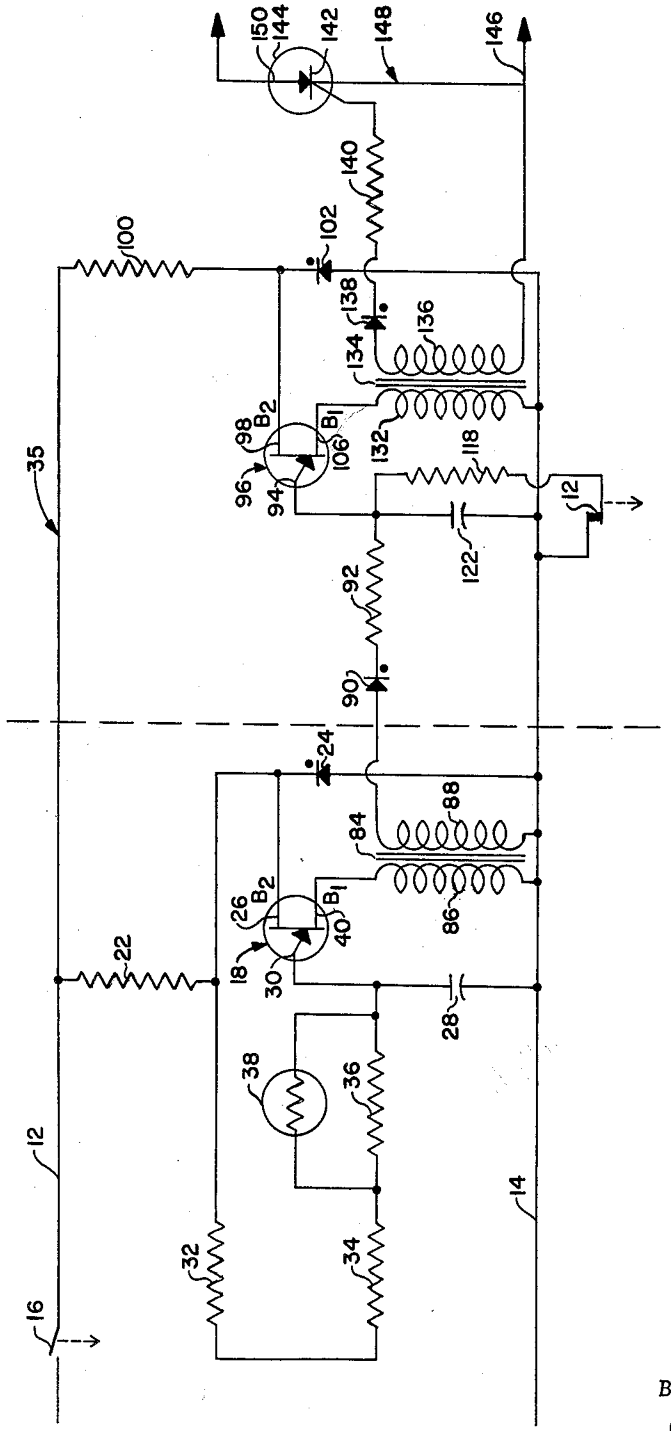

This and other objects of this invention will become more apparent when understood in the light of the accompanying drawings and specification wherein:

FIG. 1 is a circuit of a long-time static relay timer embodying the principles of this invention; and FIG. 2 is a modification of the circuit shown in FIG. 1 combined with an all-electronic control switch.

Referring now to FIG. 1 of the drawings, a timing circuit indicated generally by reference numeral 25 comprises a pair of power input leads 12 and 14. Power input lead 12 is preferably provided with a control switch 16 for controlling the operation of the circuit.

The circuit includes a first unijunction transistor 18 which functions as a gate or electronic switch for the timing circuit. Power leads 12 and 14 are connected together through a pair of normally closed relay-operated contacts 20, a voltage-dropping resistor 22, and a zener diode 24, all in series. The base-2 terminal 26 of the unijunction transistor 18 is connected between the voltage dropping resistor 22 and the zener diode 24.

This arrangement establishes a reference or bias potential on the base-2 terminal 26 of the unijunction transistor which is stable over a wide range of input voltages applied to power leads 12 and 14. It is apparent that this voltage compensating feature might be important if the timer were installed in a satellite where fluctuation in the supply voltage cannot be corrected.

A capacitor 28 is connected between the emitter terminal 30 of the unijunction transistor 18 and the power lead 14. Resistances 32, 34, and 36 are connected in series between base-2 terminal 26 and the emitter terminal 30 of the unijunction transistor 18 and the capacitor 28. This arrangement establishes a charging potential on the capacitor 28, and the rate the capacitor is charged is determined primarily by the magnitude of resistance 32 and the capacitance of the capacitor 28. A thermistor 38 is in parallel with resistance 36 to compensate the timer for increased leakage through the capacitor 28, and for variations in the behavior of the unijunction transistor due to temperature changes. In the event thermistor 38 shorts out, an additional resistance 34 is provided to protect unijunction transistor 18 from excessive current.

With the arrangement described so far, when control switch 16 is closed, and a voltage is applied across leads 12 and 14, the voltage applied to capacitor 28 through resistors 32, 34, and 36 causes capacitor 28 to charge. This accumulation of charge causes a potential of the emitter terminal 30 of the unijunction transistor 18 to rise. At a critical potential level, determined by the characteristics of the unijunction transistor and the response of the capacitor 28, the transistor 18 suddently becomes conductive. When this happens the electrical energy stored in capacitor 28 discharges through the unijunction transistor 18 in the form of a pulse.

A transformer 84, which is preferably a pulse transformer because of its small size and weight, is provided. The primary coil 86 of the pulse transformer 84 is connected between the base-1 terminal 40 of the unijunction transistor 18 and the power line 14. One terminal of the secondary coil 88 is connected through a diode rectifier 90 and a current limiting resistor 92 both to the emitter terminal 94 of a second unijunction transistor 96 and to capacitor 122.

A current limiting resistor 100 and a zener diode 102 are connected between power lines 12 and 14 with the base-2 terminal 98 of unijunction transistor 96 connected between the zener diode 102 and the current limiting resistor 100 by lead wire 104 to establish a stable reference potential thereon. A diode rectifier 108 and a relay coil 110 are connected between the base-1 terminal 106 of unijunction transistor 96 and power line 14. Normally open bypass contacts 112 and a current limiting resistor 114 are connected between power line 12 and the relay coil 110 by lead wire 116. A bleeder resistor 118 and normally closed contacts 120 are connected around capacitor 122. Contacts 120 are connected by any suitable means to switch 16 in such a way that when switch 16 is open, contacts 120 are closed, and when switch 16 is closed, contacts 120 are open. This gives the timer high precision because it prevents the accumulation of any charge on capacitor 122 before the device is set in operation. Reset contact 124 is also connected across capacitor 122 for reasons to be described below.

The operation of the circuit 25 is as follows: When switch 16 is closed, a charge begins to accumulate in capacitor 28 causing the potential of the emitter terminal 30 of the first unijunction transistor 18 to increase. This continues until the potential on the emitter terminal 30 reaches a critical value, determined by the characteristics of the unijunction transistor; then the unijunction transistor 18 suddenly becomes conductive and transmits a pulse through the primary coil 86 of the pulse transformer 84. This provides a discharge path for the capacitor 28 so that the potential of terminal 30 of unijunction transistor 18 drops sharply so that after transmitting that single pulse the first unijunction transistor 18 becomes nonconductive. However, once the unijunction transistor 18 becomes nonconductive, a charge can again accumulate in capacitor 28 causing the potential of the emitter terminal 30 to rise until the critical value of the unijunction transistor is reached for another pulse.

Each pulse passing through primary coil 86 is transmitted to the secondary coil 88 where the voltage may be increased as desired. This pulse is rectified by diode rectifier 90 and a portion of the pulse energy is stored in the capacitor 122. With this arrangement, it is apparent that each time the unijunction transistor 18 becomes conductive and discharges a pulse through the pulse transformer 84, a certain portion of that energy is stored in capacitor 122, causing the potential of the emitter terminal 94 of unijunction 96 to rise. This continues for a predetermined number of pulses from unijunction transistor 18 until the potential of the emitter terminal 94 rises to the critical value of the unijunction transistor 96, so that the unijunction transistor 96 suddenly becomes conductive.

When this happens the capacitor 122 discharges through rectifier 108 into relay coil 110, actuating all contacts controlled by that relay coil. It is noted that diode rectifier 90 prevents this discharge from reaching the pulse transformer 84 and thereby affecting the operation of unijunction transistor 18.

When relay coil 110 is energized, contacts 112 close, bypassing both unijunction transistors and keeping the relay coil 110 energized independently of the operation of these transistors. In addition, contacts 20 open, cutting off power to both the unijunction transistor 18 and unijunction transistor 96. At the same time, contacts 48 and 124 close, completely discharging capacitors 28 and 122, in order to erase all residual charges in these capacitors, and thus insure high accuracy each time the timer is used. Relay coil 110 may also control contacts 126 and 128 in circuits isolated from the timer circuit, for control purposes. With this arrangement, it is apparent that circuits having almost any desired time delay, can be designed by merely increasing the number of sections or stages composing the timing circuit.

Under some circumstances, it may be desirable or necessary to have a long time solid state timer with no moving contacts in the circuit controlled by the timer. Circuit 35 shown in FIG. 2 has this feature and the circuit elements which are connected together in the same way and perform the same function as the circuit elements in circuits 10, 15, and 25 have been given the same reference numerals. The long-time solid state timing circuit shown in FIG. 2 differs from the timing circuit 25 in that the primary coil 132 of an isolating transformer 134 is connected between base-1 terminal 106 and power line 14 of unijunction transistor 96. One end of the secondary coil 136 of the isolating transformer is connected through a diode rectifier 138 and a voltage dropping resistor 140 to the plate 142 of a silicon controlled rectifier 144. The opposite end of the secondary coil 136 is connected to a line 146 in an isolated circuit 148 controlled by timing circuit 35. When control switch 16 is closed, pulses from unijunction transistor 18 accumulate in capacitor 122 as described in connection with circuit 25. This causes the voltage on the emitter terminal 94 of the unijunction transistor 96 to increase until the critical voltage is reached, causing the unijunction transistor 96 to become conductive. When the unijunction transistor becomes conductive, a pulse is transmitted through the primary coil of the isolating transformer 134. This pulse alters the voltage relationship of the electrodes in the silicon controlled rectifier 144, causing it to become conductive, so that current can flow through the anode terminal 150 and on through line 146 in the isolated circuit 148. In this way, the isolated circuit is controlled without the use of any moving contacts.

It is to be understood that the form of the invention herewith shown and described is to be taken as a preferred example of the same, and that various changes in the shape, size, and arrangement of the parts may be resorted to without departing from the spirit of this invention or the scope of the claims.

We claim:

1. A device of the class described comprising in combination a first unijunction transistor, means for establishing a reference potential at the base-2 terminal of the first unijunction transistor, a first accumulator having a response which increases generally with an increasing input, said accumulator associated with the emitter terminal of said first unijunction transistor, means connected to said accumulator for causing an increasing response therein whereby the association of said first unijunction transistor and said first accumulator causes the first unijunction transistor to become conductive when the response of said first accumulator increases to a predetermined level, a second unijunction transistor, means for establishing a reference potential at the base-2 terminal of the second unijunction transistor, a second accumulator having a response which increases generally with an increasing input, said second accumulator associated with the emitter terminal of said second unijunction transistor, combined means operating when said first unijunction transistor becomes conductive both for decreasing the response of said first accumulator until said first unijunction transistor becomes nonconductive, and for transmitting a pulse to said second accumulator for causing a predetermined response therein, whereby the association of said second unijunction transistor and said second accumulator causes said second unijunction transistor to become conductive when the number of pulses transmitted to said second accumulator increases its response to a predetermined level, an electric unit associated with said second unijunction transistor and actuated when said second unijunction transistor becomes conductive.

2. A device of the class described comprising in combination a pair of power leads, a first unijunction transistor, first means for establishing a reference potential on the base-2 terminal of the first unijunction transistor, a first capacitor connected between the emitter terminal of said first unijunction transistor and one of said power leads, means connected between said base-2 terminal of said first unijunction transistor and said first capacitor for applying a voltage to said capacitor and causing it to charge at a controlled rate, thereby causing the potential of the emitter terminal of said first unijunction transistor to increase, the connection between said first capacitor and said emitter terminal of said first unijunction transistor such that when the potential on said emitter terminal increases to a predetermined level the first unijunction transistor becomes conductive, a second unijunction transistor, second means for establishing a reference potential on the base-2 terminal of said second unijunction transistor, a second capacitor connected between the emitter terminal of said second unijunction transistor and said one of said power leads, a transformer, one terminal of the primary coil of said transformer connected to the base-1 terminal of said first unijunction transistor, one terminal of the secondary coil of said transformer connected in series with a rectifier and a current limiting resistor to one terminal of said second capacitor whereby each time said first unijunction transistor becomes conductive the first capacitor discharges through said primary coil of said transformer causing said first unijunction transistor to become nonconductive and at the same time the discharge of said first capacitor transmits a voltage pulse to said second capacitor, charging said second capacitor a predetermined amount whereby the association of said second unijunction transistor and said second capacitor causes said second unijunction transistor to become conductive when the number of pulses transmitted to said second capacitor increases its response sufficiently, an electric unit associated with said second unijunction transistor and actuated thereby when said second unijunction transistor becomes conductive.

3. The device described in claim 2 wherein the first means and the second means for establishing a reference potential on the base-2 terminals of the first and second unijunction transistor each comprise a voltage dropping resistor and a Zener diode in series and connected between said power leads, an electrical connection between each Zener diode and the base-2 terminal of an associated unijunction transistor whereby the reference potential is stable over a wide range of voltages applied to said power leads.

4. The device described in claim 3 wherein said means for applying a voltage between the base-2 terminal and the emitter terminal of said first unijunction transistor comprise a series of resistors connected therebetween, at least a part of said resistance temperature compensated so that the charging rate of said first capacitance is not affected by temperature changes.

5. The device described in claim 2 including a control switch in one of said power leads, a second switch connected to the second capacitor in such a way as to prevent charges from accumulating thereon when said second switch is closed, a connection between said control switch and said second switch whereby when said control switch is open the second switch is closed to prevent the accumulation of charge thereon while the device is shut down, and when said control switch is closed for operation of the device said second switch opens to permit said second capacitor to charge.

6. The device described in claim 5 including means for completely discharging said first and second capacitors when said second unijunction transistors become conductive.

7. The device described in claim 6 wherein said electric circuit is a relay, one terminal of the relay coil connected to the base-1 terminal of said second unijunction transistor, and the other terminal of the relay coil connected to one of said power leads whereby when said second unijunction transistor becomes conductive said relay is actuated to operate a plurality of electrical contacts.

8. The device described in claim 2 wherein said electric unit comprises an isolated circuit, a silicon controlled rectifier switch in said isolated circuit, an isolation transformer, one terminal of the primary coil of said isolation transformer connected to the base-1 terminal of said second unijunction transistor, the opposite terminal of said primary coil connected to one of said power lines, one terminal of the secondary coil of said isolation transformer connected in series with a rectifier and a voltage limiting resistor to a terminal of said silicon controlled rectifier, the opposite terminal of the secondary coil of said isolation transformer connected to a line in said isolated circuit whereby whenever the said second unijunction transistor becomes conductive a pulse is transmitted to said silicon rectifier causing the silicon controlled rectifier switch to conduct current while said second unijunction transistor is conductive.

References Cited in the file of this patent

UNITED STATES PATENTS

| | | |
|---|---|---|
| 2,792,535 | Struven | May 14, 1957 |
| 2,912,632 | Moore | Dec. 1, 1959 |
| 3,027,492 | De Vita | Mar. 27, 1962 |